ated Jan. 3, 1973

United States Patent [19]
Neuner et al.

[11] 3,893,090
[45] July 1, 1975

[54] POSITION INDICATION SYSTEM

[75] Inventors: James A. Neuner, Gibsonia; Dirk J. Boomgaard, Monroeville, both of Pa.

[73] Assignee: Westinghouse Electric Corporation, Pittsburgh, Pa.

[22] Filed: Jan. 3, 1973

[21] Appl. No.: 320,773

[52] U.S. Cl.............. 340/188 R; 340/179; 340/181; 340/195; 176/19 EC
[51] Int. Cl....................... G08b 23/00; G08c 19/06
[58] Field of Search ................................ 340/188 R

[56] References Cited
UNITED STATES PATENTS
2,922,994  1/1960  Kennedy ......................... 340/188 R
3,443,438  5/1969  Martin ............................ 340/188 R

*Primary Examiner*—Thomas B. Habecker
*Attorney, Agent, or Firm*—D. C. Abeles

[57] ABSTRACT

A position indication system for displaying the position of a movable element with respect to fixed known coordinates. A plurality of sensors, individually responsive to the elements pressence, are arranged in two groups along the path of movement of the movable element in an interleaved array of alternate sensors of the corresponding groups. The two groups of sensors are responsive to the element's position to respectively provide discrete outputs indicative thereof. A control circuit combines the respective discrete outputs into a display output representative of the element's position. The control circuit additionally monitors the separate discrete outputs for malfunctions and dissociates either group exhibiting a malfunction from representation within the display output so that the display output is indicative of only functioning groups of sensors. The display output activates individual lights within a display unit which provides a pictorial display of the element's position. Each light within the display corresponds to a center location between sensors within the interleaved array. The presence of a given portion of the movable element within that center location is indicated by the lighting of a corresponding lamp. Means associated with the control circuit is responsive to a malfunction indicated thereby to align the display output to alternately flash two adjacent lights within the display unit corresponding to the centers on either side of the sensor within the malfunctioning group most nearly proximate the given portion of the element so as to both indicate a malfunction and provide information on the element's location with substantially equal plus or minus deviation.

5 Claims, 3 Drawing Figures

POSITION INDICATION SYSTEM

CROSS REFERENCE TO RELATED APPLICATIONS

The present invention is related to the inventions covered by copending U.S. Pat. applications: (W. E. Case No. 43,906) Ser. No. 320,776, entitled "Position Indication System," by F. T. Thompson, Frederick J. Young and D. J. Boomgaard; and (W. E. Case No. 44,067) Ser. No. 320,792, entitled "Digital Multiplexed Position Indication and Transmission System" by J. A. Neuner, F. T. Thompson and L. Vercellotti. All of the aforementioned U.S. patent applications are assigned to the assignee of the present invention and are filed concurrently herewith.

BACKGROUND OF THE INVENTION

This invention pertains in general to position indication systems for monitoring the position of a movable element and more particularly to such systems utilizing complementary redundancy to provide position indication at full resolution.

A new position indicator, utilizing a tandem arrangement of simple single winding coils is described in copending patent application, Ser. No. 320,776, (W. E. Case No. 43,906). The individual coils of the tandem arrangement are substantially identical requiring no tuning or calibration. A new digital multiplexed position indication and transmission system ideally applicable for communicating the sensory signals generated by the new indicator is described in U.S. Pat. application Ser. No. 320,792, (W. E. Case. No. 44,067). The disclosed transmission system minimizes the expense of field wiring normally required for remote monitoring applications as well as minimizes the associated hardware employed. In addition, redundancy is provided so that position information is not completely lost in the event of a malfunction. Although the new system continues to perform with approximately half resolution upon the failure of either the coils or the electronics associated with a single sensory group the resulting position information is not centered within the bounds of the position output signal which transitions in discrete stable states.

In a specific application to reactor control rod position indication, redundancy is provided by an interleaved tandem arrangement of sensors alternately connected in two groups. The sensors are spaced along the control rods at approximately a distance of 6 steps of the magnetic jack mechanism, which controls the movement of the control rods. A failure of one group of sensors will provide a deviation within the readout of approximately +3, −9 steps, while a failure of the other sensory group will provide a readout deviation of +9, −3 steps. Each step of the magnetic jack mechanism (the operation of which is more fully described in U.S. Pat. No. 3,158,766, issued to E. Frisch) moves the control rods approximately 0.625 inches. The discrete transition states of the readout are gauged to correspond to the center location between sensory coils representing six steps of the magnetic jack mechanism. With the aforecited tolerances, it is almost impossible, under reduced resolution as required by government regulation to set the control rod deviation criteria such that comparative rod deviations greater than 15 inches will always cause an alarm and at the same time prevent spurious alarms when the control rod deviations are less than approximately 2.5 inches. If the resulting tolerances on the corresponding indicated display positions, under half resolution, were approximately equal, that is plus or minus six steps, then both the 15 inch and the 2.5 inch requirements could be met.

A design deviation criteria providing symmetrical tolerances is specifically desirable where more than one movable element is being monitored and a comparison is desired between the relative position of the elements with respect to each other. In an application to nuclear reactors where the control rods are arranged in banks, approximately four banks to a four loop nuclear plant, and the banks are generally arranged in two groups, it is important to control rod deviation in order to maintain a power balance within the reactor core. If more than a 15 inch difference is encountered between the rods of corresponding groups the resulting large temperature gradient will deform the core and incapacitate the reactor.

Accordingly, a system is desired that will provide symmetrical tolerances around the indicated position, even at half resolution, so that the desired position deviation criteria can be met with a minimum of associated hardware.

SUMMARY OF THE INVENTION

Briefly, this invention provides an improved position indication system for displaying the position of a movable element with respect to fixed known coordinates. The fixed coordinates are defined by the location of a plurality of sensors individually responsive to the element's presence. The sensors are positioned along the path of movement of the movable element in two groups arranged in an interleaved array of alternate sensors. The two respective groups of sensors are responsive to the element's position to provide corresponding discrete outputs indicative thereof. A control circuit combines the respective discrete outputs into a display output signal representation of the element's position. The control circuit further functions to monitor the corresponding discrete outputs for malfunctions and disassociates either of the groups exhibiting a malfunction from representation within the display output so that the display signal is indicative of only functioning groups of sensors.

The display output provides an indication of the element's location in discrete steps corresponding to the center band between sensors. If a given group of sensors are disassociated from the display output, due to a malfunction, the operating group will continue to provide position indication with approximately half resolution. Means are provided to adjust the display output to correspond to the center band between the operating sensors most nearly situated to a given portion of the movable element to provide a better indication of the element's location even under operation at half resolution.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

In most position indication systems which monitor the location of a movable element by providing discrete outputs indicative thereof it is desirable that the discrete output steps representative of the element's position be provided with symmetrical deviation. This invention describes apparatus for providing symmetrical deviations even under fault operating conditions. While the system contemplated by this invention will be described in an application to nuclear reactor control rod position indication, it should be understood that this invention has an analogous applicability to other sensory system utilizing complementary redundancy.

To provide reliable and accurate position information in an application to nuclear reactor control rod position indication, even under single failure conditions, for each control rod, the sensors and the associated containment electronics employed within the position indication system contemplated by this invention (more fully described in copending application Ser. No. 320,792, W. E. Case No. 44,067 cited above) are divided into two separate identical groups. EAch group is capable of providing redundant information on the true position of the control rod with one-half of the system's overall resolution. The two sets of data are transmitted through independent time division multiplexed channels to the reactor control room where independent error checking is performed. The two sets of verified data are sent to a central control unit and combined to determine the true position of the control rod with the required full resolution desired.

If a failure occurs in either group, it will be automatically detected resulting in the rejection of the corresponding data so that the true rod position, determined by the remaining group, will still be displayed with reduced resolution.

Figure 1:
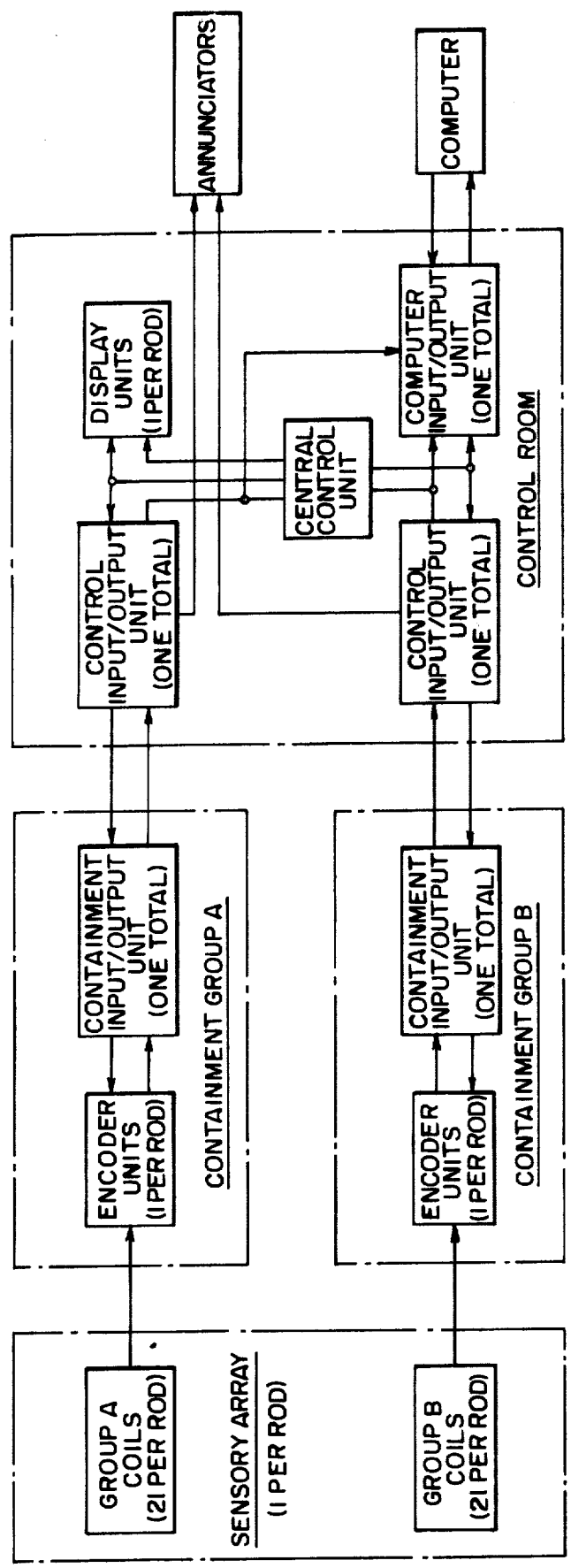
FIG. 1 is a block digaram of a position indication system incorporating the concepts of this invention.

Rod position information is available through independent and separate outputs, including a local real time display using light emitting diodes for the reactor operator, and a plant computer which operates as a data logger. A block diagram of the overall position indication system is illustrated in FIG. 1. Redundancy is implemented within the sensors, containment electronics and display area as pictorially illustrated by groups A and B respectively identifying the separate signal trains. The operation of each of the individual blocks, identified by legions, can better be understood by reference to the explanation provided in copending applications Ser. No. 320,792, W. E. Case No. 44,067 cited above.

The basic sensor of this exemplary embodiment is an electrical coil positioned around the circumference of the axis of movement of the movable element whose position is being detected. In an application to nuclear reactor control rod position indication, the coil is positioned around the control rod travel housing which is a hermetically sealed housing longitudinally extending from the head of the reactor pressure vessel. When an AC current is established within the coil, an AC flux is created which penetrates the rod travel housing. If a metal rod is moved through the portion of the rod travel housing encompassed by the coil, the impedance of the coil will change. This change in impedance can then be detected as an indication of the position of the rod.

Figure 2:
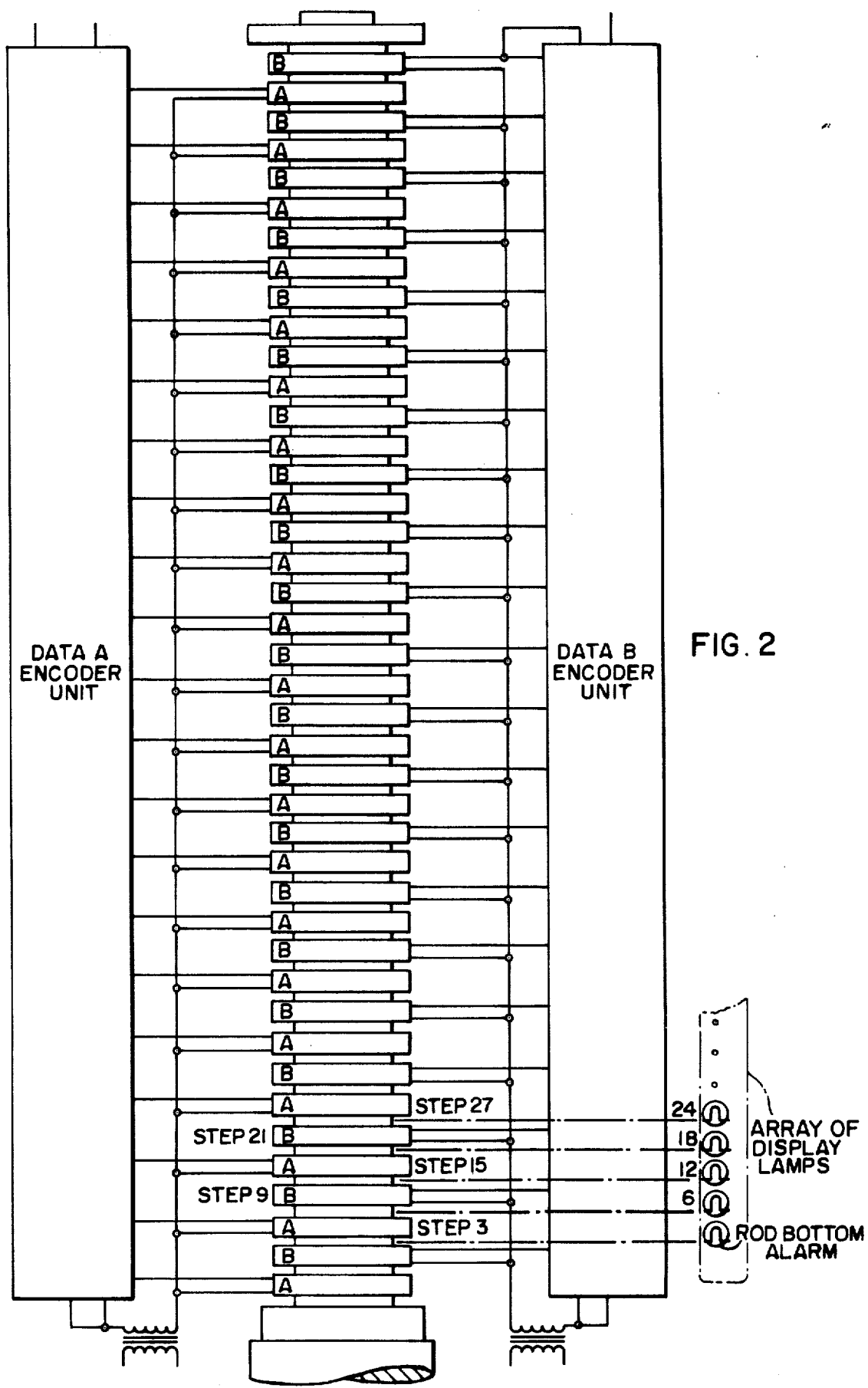
FIG. 2 is a schematic diagram of one embodiment of a sensory system array which can be employed in conjunction with this invention.

To build a complete rod position indication sensor a stack of coils are arranged and mounted in tandem on the rod travel housing as illustrated in FIG. 2. To provide the complementary redundancy contemplated by this invention, the tandem arrangement of coils is divided into two interleaved groups, A and B. The signals obtained from each group of coils are processed separately within the reactor containment. Each group provides separate discrete information on the control rod's position by a comparison of the corresponding impedances monitored within adjacent coils of the respective groups. Thus, the signals generated by each group contain the information required to locate the position of the control rod within one-half of the overall resolution of the system. Therefore, if one group malfunctions, the system's resolution is degraded but the location of the control rod is still known.

Each of the approximately 61 control rods within a four loop reactor plant have such a tandem arrangement of coils, plus a group A and group B encoder within the reactor containment structure to encode the corresponding sensory signal for communication along multiplexed transmission lines. There are approximately 42 individual coils provided for each rod, 21 per group, with an encoder associated with each rod per group. A single input/output interface is provided within the containment for the A group and another for the B group encoder units. The interface sequentially addresses each encoder in its group according to a command address generated within the central control unit and accepts a five-bit digital gray code from the corresponding encoder containing the control rod position data for each rod. In this manner, the data for each group is multiplexed onto a single set of field wires, thereby minimizing containment penetrations and field wiring costs. At the reactor control room, a similar input/output interface is employed in conjunction with the control circuitry to demultiplex the information for each rod and combine the data to provide full resolution rod position information. This information is then used to control a novel light-emitting diode display which pictorially illustrates the rod position information in discrete steps. As previously mentioned, the electrical coils surrounding each rod travel housing are spaced at approximately six steps of the magnetic jack mechanism. The plurality of light-emitting diodes within each display are calibrated to correspond to the center locations between coils; one such display being provided per control rod. Ideally, the transition point for each discrete output state (lamp) occurs as the control rod passes the area circumferenced by the respective coils. Assuming the control rod bottom location being as indicated by the reference character RB (indicating the lower extreme of rod travel) and the first coil within the A group being positioned three steps above that location, then the next B coil would be situated at step nine of the magnetic jack mechanism followed by an A coil at step 15 and a B coil at step 21, etc. Consequently, the first indicator lamp on the corresponding display unit, illustratively shown in FIG. 2, would indicate rod position midway between the first A coil and the first B coil above rod bottom, namely, the sixth step. The next indicator lamp would then correspond to the 12th step, following the 18th step, etc. Accordingly, as the control rod passes through the center of the coil in the A group at the third step, the indicator lamp associated with the center location between coils just above that coil would light, indicating that the rod is at step six with a deviation of plus or minus three steps. The next transition would occur when the rod passed through the center of the next B coil lighting the corresponding lamp associated with the 12 th step (plus or minus a three step deviation).

Although the rod position indication system continues to perform at half resolution upon the failure of either group of coils, or corresponding containment electronics, the resulting indication of rod position is not centered within the bounds of the active stable states provided on the display as it would be under full resolution. For example, if group B should fail and the display lamp corresponding to step 24 should illuminate, it would indicate the location of the rod between a band defined by steps 15 and 27 so that the resulting tolerance on the indicated position would be +3, −9 steps. In a similar manner, if group A should fail the resulting tolerance on the display indicated position would be +9, −3 steps.

This invention removes the unsymmetrical deviation occurring when a fault condition is monitored to make the resulting tolerances on the indicated position symmetrical in a manner that will satisfy the desired rod deviation requirements with a minimum number of sensor coils and associated hardware.

Figure 3:
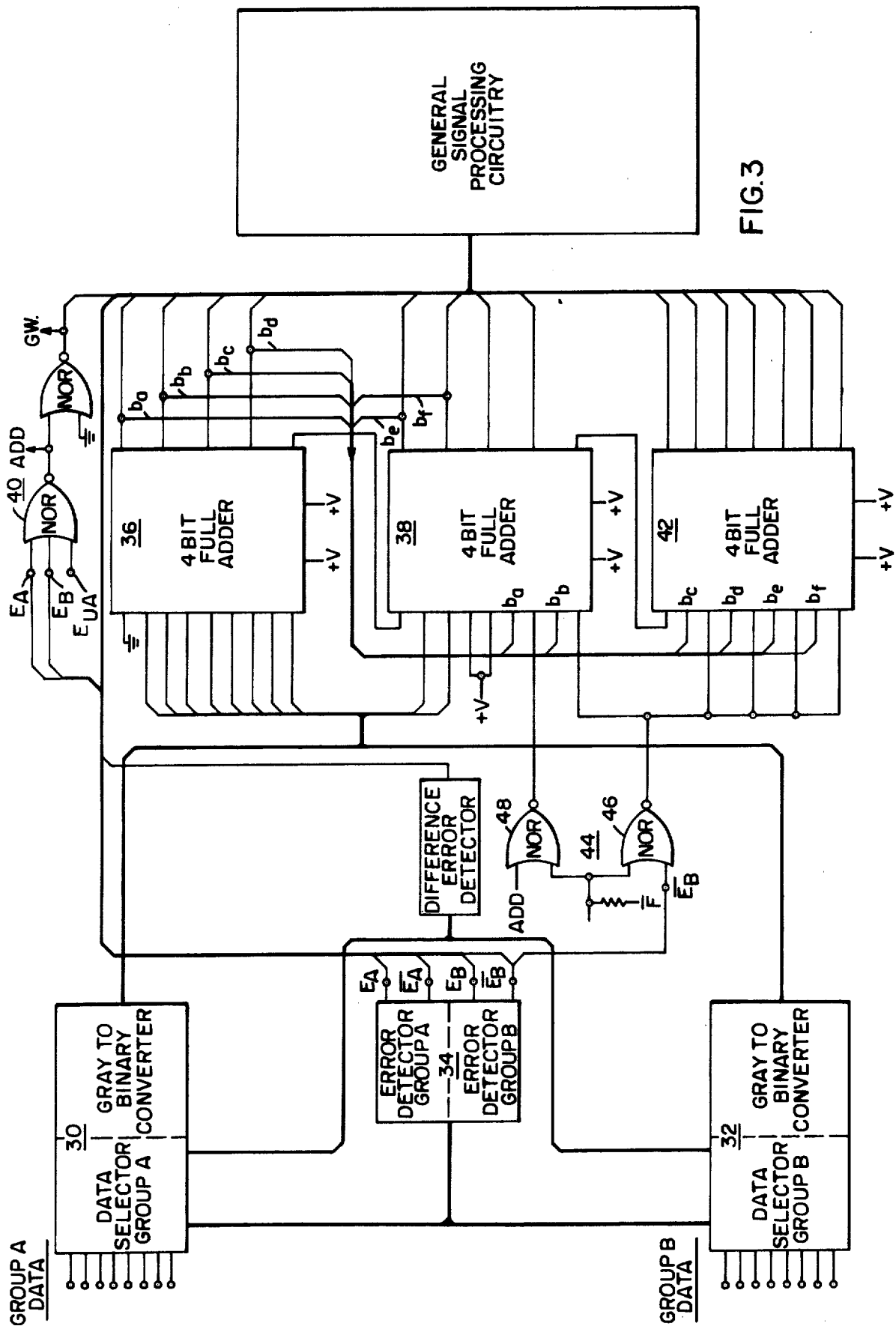
FIG. 3 is a schematic circuitry diagram of an exemplary circuit which can be employed to implement the concepts of this invention.

Since the bounds of each stable state on the display are determined by the location of each coil and since the location of each coil is specified for optimum performance at full accuracy, the resulting tolerances can only be made symmetrical by appropriately changing the position number indicated on the readout. For example, if the data from group B should fail and the control rod was located between steps 15 and 27, the appropriate position number to be displayed on the readout would be 21 instead of step 24 which would otherwise be indicated. This number, however, is, as in all cases, not associated with a light-emitting diode on the display unit. To add 38 light-emitting diodes and the associated circuitry to each display unit in order to accommodate such a situation would double the circuitry required in a major portion of the system. However, the desired position is halfway between two existing positions and can be displayed by alternately flashing the light-emitting diodes corresponding to coordinates above and below that position. The portion of the circuitry within the central control unit responsible for summing the digital outputs of groups A and B is modified as illustrated in FIG. 3, to accomplish this result. When a fault condition is monitored the sum of the two groups A and B is altered by adding or subtracting one in binary 50 percent of the time. An error in group A will result in the addition of a binary one while an error in group B will result in the subtraction of a binary one, 50 percent of the time, thus offsetting the apparent uncentered tolerance. In a similar manner, information within the computer described in copending applications Ser. No. 320,792, (W. E. Case No. 44,067), can be centered requiring only a small increase in program complexity. Here again, three steps (equivalent to one-half of the discrete output transition in the display) are either added or subtracted from the previous final position indicated depending upon which group malfunctions. This provides the same result as described for the visual display units.

A comprehensive understanding of the circuitry illustrated in FIG. 3 for accomplishing the desired symmetrical deviation can better be understood if the following description is read in conjunction with the operational description of the control unit circuitry provided in FIG. 7 of application Ser. No. 320,792, (W. E. Case No. 44,067),As described in the forecited application, the data provided by group A is processed through the circuitry generally identified in this embodiment by reference character 30 and the data provided ). As group B is processed through the circuitry generally described by reference character 32. If an error is monitored in either group, the group exhibiting the error is disconnected from the processing circuitry and the functioning group inputs are provided in its place by the circuitry generally illustrated by reference character 34. When both groups are functioning properly the resulting data from the respective groups are combined into a coded output by the two four bit fuller adders 36 and 38. When a fault condition is monitored and the malfunctioning group is disconnected and replaced by the inputs from the operating group the output of the adders will reflect twice the digital value of the operating group inputs. The output of the full adders are altered under a fault condition, to provide centering (symmetrical deviation) by the circuitry generally described by reference characters 40, 42, and 44.

Referring to FIG. 3 and the operational description of the central control unit provided in copending application Ser. No. 320,792, (W. E. Case No. 44,067), it will be apparent that outputs $b_a$ through $b_f$ of adders 36 and 38 are the binary representation of the true rod position as obtained from adding groups A and B or as in a fault situation adding the operating group to itself. These outputs are fed back as indicated by like reference characters to the inputs shown on the adders 38 and 42 identified by $b_a$ through $b_f$ and are enabled under fault conditions to provide the desired centering by the circuitry generally described by reference character 44. Units 38 and 42 operate as a full adder to add or subtract a binary one to obtain a flashing indication of the centered location. Error codes $E_A$ and $E_B$, provided by the circuitry generally described by reference character 34, indicate the group exhibiting the malfunction and correspondingly control whether to add or subtract. Subtraction is accomplished by the full adders 38 and 42 by a technique well known in the art as "ones compliment". The inverse of the error signal $E_B$ provides the operational ability to subtract and is applied directly to the input of the NAND gate 46 illustrated within the circuitry 44. The presence of signal $\bar{E}_B$ (inverse of $E_b$) together with a corresponding strobe signal $\bar{F}$ enables the circuitry to generate the required subtraction to accomplish centering under a malfunction in group B. Similarly, an add signal is provided to a parallel NAND gate 48 illustrated within the circuitry 24 to enable the full adder formed by units 38 and 42 to add a binary one to accomplish centering under a fault condition associated with a group A malfunction. The add signal is derived from the NOR gate 40 and is generated by either the occurrence of a $E_A$ or $E_B$ or $E_{uA}$ (urgent alarm signal) more fully described in the operational description of the central control unit. The flash strobe signal identified by F is generated by another portion of the central control unit illustrated in the previously cited application. The signal F occurs 50 percent of the time and enables the circuitry 44 to activate the full adder 38 and 42 to perform either the addition or subtraction of the centering operation. Thus 50 percent of the time a binary one will either be added to or subtracted from the rod position indication output, depending upon the group exhibiting the failure. The remaining period of time a binary 0 will be added to the indication output resulting in the output state which would normally occur without the centering circuitry provided by this invention.

Thus, a new output is provided which alternately flashes the output display lamps corresponding to the operating coils above and below the lead portion of the control rod, indicating an output state centered therebetween with plus or minus a six step deviation.

Accordingly, the automatic self-centering concept contemplated by this invention offers several advantages. By centering the tolerance it is possible to meet tighter rod deviation requirements without creating false alarms. Since this benefit is accomplished without actually increasing the accuracy of the system, a minimum amount of coils and electronics will be required. The advantages are even more apparent when a relative comparison of the position of the two rods is desired under a worst case deviation. Furthermore, display units are kept at a minimum with no additional light-emitting diodes required.

We claim as our invention:

1. A position indication system for displaying the relative position of a movable element with respect to fixed known coordinates comprising:

a plurality of sensory means arranged in first and second groups in corresponding configurations which are positioned proximate to and substantially equally spaced along the path of movement of the movable element, the individual locations of said sensory means defining the fixed known coordinates, said sensory means of said first group are alternately interleaved within the arrangement of said sensory means of said second group and each of said groups are responsive to the element's position to respectively provide discrete electrical outputs indicative of the element's position with respect to the corresponding locations of said sensory means;

means for combining the respective discrete outputs of said first and second groups of sensory means to provide a display output representative of the elements position;

means for monitoring said discrete outputs for malfunctions and responsive to a malfunction to disconnect either said first or second group exhibiting a malfunction from representation within said display output so that said display output is representative only of functioning groups of said sensors; and means electrically connected to said monitoring means and combining means and responsive to a malfunction indicated by said monitoring means to alter the inputs to the combining means to align said display output to indicate the presence of the movable element substantially centered between two of said sensory means within said functioning group most nearly proximate a predetermined portion of the element.

2. The position indication system of claim 1 including display means electrically connected and responsive to said display output to provide a pictorial display of the element's position.

3. The position indication system of claim 2 wherein said display means comprises a plurality of lights respectively associated with the corresponding center locations between said sensors within said interleaved array, said plurality of lights being consecutively activated, one at a time, in accordance with said display output to indicate the element's position.

4. The position indication system of claim 3 wherein said aligning means is electrically connected to said monitoring means and is responsive to a malfunction to light two adjacent lamps within said plurality of lights corresponding to coordinates on either side of said predetermined portion of said element, so as to both indicate a malfunction and provide more information on the element's position.

5. The position indication system of claim 4 wherein said two adjacent lights are alternately flashed.

* * * * *